US009237312B2

(12) United States Patent
Faimatea et al.

(10) Patent No.: US 9,237,312 B2
(45) Date of Patent: Jan. 12, 2016

(54) METHOD AND A SYSTEM FOR DELIVERY OF DATA TO AN END USER

(75) Inventors: Will Faimatea, Sidney (AU); Robin G. Zebedee, Langwedel (DE); Vladimir Cintula, Amsterdam (NL)

(73) Assignee: BOND TV LLC, Wimington, DE (US)

( * ) Notice: Subject to any disclaimer, the term of this patent is extended or adjusted under 35 U.S.C. 154(b) by 425 days.

(21) Appl. No.: 12/862,383

(22) Filed: Aug. 24, 2010

(65) Prior Publication Data

US 2011/0055863 A1    Mar. 3, 2011

(30) Foreign Application Priority Data

Aug. 25, 2009 (EP) .................................. 09168631

(51) Int. Cl.
| H04N 7/20 | (2006.01) |
| H04N 7/173 | (2011.01) |
| H04N 21/218 | (2011.01) |
| H04N 21/2312 | (2011.01) |
| H04N 21/258 | (2011.01) |
| H04N 21/4143 | (2011.01) |
| H04N 21/475 | (2011.01) |
| H04N 21/61 | (2011.01) |
| H04N 21/643 | (2011.01) |

(52) U.S. Cl.
CPC ....... *H04N 7/17318* (2013.01); *H04N 21/2181* (2013.01); *H04N 21/2312* (2013.01); *H04N 21/25875* (2013.01); *H04N 21/4143* (2013.01); *H04N 21/4753* (2013.01); *H04N 21/6125* (2013.01); *H04N 21/64322* (2013.01)

(58) Field of Classification Search
CPC ............ H04N 7/4143; H04N 21/4753; H04N 21/6125; H04N 21/64322
USPC ...................................................... 725/63–72
See application file for complete search history.

(56) References Cited

U.S. PATENT DOCUMENTS

| 5,563,606 | A | * | 10/1996 | Wang | 342/354 |
| 7,394,779 | B2 | * | 7/2008 | Seo et al. | 370/316 |
| 7,394,780 | B1 | | 7/2008 | Gregory et al. | |
| 2004/0172647 | A1 | * | 9/2004 | Godwin | 725/36 |
| 2010/0229206 | A1 | * | 9/2010 | Dankberg | 725/68 |

OTHER PUBLICATIONS

Kumar, Lalit, et al., "Design & Development of Small Linux Operating System for Browser Based Digital Set Top Box", Computational Intelligence, Communication Systems and Networks, 2009. CICSYN '09. First International Conference on, IEEE, Piscataway, NJ, USA, Jul. 23, 2009, pp. 277-281.
De Lattre, A., et al., "VideoLAN Streaming Howto" Internet Citation Jan. 25, 2007, XP007901600 Retrieved from the Internet: URL:http://www.videolan.org/doc/streaming-howto/en/ [retrieved on Jan. 25, 207].
Garcia, L., et al., "Protected seamless content delivery in P2P wireless and wired networks" IEEE Wireless Communications, IEEE Service Center, Piscataway, NJ, US LNKD—DOI:10, 1109/MWC. 2009.5300302, vol. 16, No. 5, Oct. 1, 2009, pp. 50-57.

* cited by examiner

*Primary Examiner* — Pankaj Kumar
*Assistant Examiner* — Alazar Tilahun
(74) *Attorney, Agent, or Firm* — Winstead PC

(57) ABSTRACT

A method for delivery of data to an end user, wherein the method comprises the steps of hosting at a first location a first receiver, specific to the first location, receiving data on said first receiver, forwarding data from the first receiver to a processor, for processing the data, forwarding the processed data to a Content Delivery Network (CDN), with at least one node connected to the Internet, receiving on the at least one node of the CDN a request from the end user to have access to data specific to the first location, verifying the identity of the end user and, where the verification is positive and forwarding processed data from the at least one node of the CDN to the end user via the CDN and Internet.

15 Claims, 4 Drawing Sheets

METHOD AND A SYSTEM FOR DELIVERY OF DATA TO AN END USER

FIELD OF THE INVENTION

The present invention relates to a system and a method for delivery of data to an end user. According to the invention the end user only needs a computer device connected to the Internet to access the data.

BACKGROUND OF THE INVENTION

Over the years a large number of systems and devices have been developed to allow an end user to watch television, in particular satellite or cable transmitted television. Those systems and devices enable an end user to have access to the television content using a personal receiver in order to receive a television signal.

According to the prior art, the quality of the television signal received by the end user will depend on several properties of the devices used by the end user. Moreover, the television signal will only be available if and when the receiver of the end user is in the "footprint" of the transmission. In the case of satellite transmission, provided that the satellite dish is able to see the satellite, the quality of the signal will depend on, at least, the size of the satellite dish and the other hardware and software that is used to process the received signal and to display the signal on a screen.

One aspect of the present invention is to overcome at least some of the problems associated with the prior art.

The present invention is particularly adapted for end users who want to be free to receive the television signal at a physical location of their choice irrespective of where that might be. The method and the system according to the present invention are specifically useful for an end user who wants to watch television at a location that is not fixed, for example from a boat, a yacht, other vehicle or generally just when the user is on the move. The invention will allow a boat-user, for example, to watch transmitted television programs, irrespective of where the boat is positioned on the globe.

SUMMARY OF THE INVENTION

The present invention provides a method and a system for delivery of data to an end user.

According to one aspect of the present invention there is provided a method for delivery of data to an end user, wherein the method comprises the steps of hosting at a first location a first receiver, specific to the first location, receiving data on said first receiver, forwarding data from the first receiver to a processor, for processing the data, forwarding the processed data to a Content Delivery Network (CDN), with at least one node connected to the Internet, receiving on the at least one node of the CDN a request from the end user to have access to data specific to the first location, verifying the identity of the end user, where the verification is positive and forwarding processed data from the at least one node of the CDN to the end user via the CDN and Internet.

According to a second aspect of the present invention there is provided a system for delivery of data to an end user, wherein the system comprises a first receiver hosted at a first location, for receiving data transmitted in the first location, a processor connected to the first receiver for processing data received on the first receiver, a Content Delivery Network (CDN) connected to the processor for receiving the processed data on the CDN and for forwarding the data towards an end user, wherein CDN has at least one node; wherein the at least one node is connected to the Internet; and wherein the at least one node receives a request from the end user to have access to the data on the CDN and an identity verification tool for verifying the identity of an end user and for allowing or refusing the end user to access the data on the CDN.

According to a third aspect of the present invention there is provided a computer program comprising instructions for carrying out the method according to the invention when said computer program is executed on a programmable apparatus.

In the present description the wording 'Content Delivery Network' (CDN) is used in order to indicate a group of strategically located, high capacity Internet connected network servers. These servers cooperate in order to distribute content allowing a relatively high speed and a relatively high quality when compared to data transported on the Internet without the use of this CDN.

BRIEF DESCRIPTION OF THE DRAWINGS

Reference will now be made, by way of example, to the accompanying drawings, in which.

DETAILED DESCRIPTION OF THE PREFERRED EMBODIMENTS

The present invention relates to a method and system of delivering data to an end user. The data includes a television signal or other type of transport screen stream relating to audiovisual entertainment or media data. The present invention enables such entertainment data to be received in a location appropriate for the data (for example within the footprint of a satellite transmission), converted into Internet packets, and transmitted via the Internet to any location.

Figure 1:
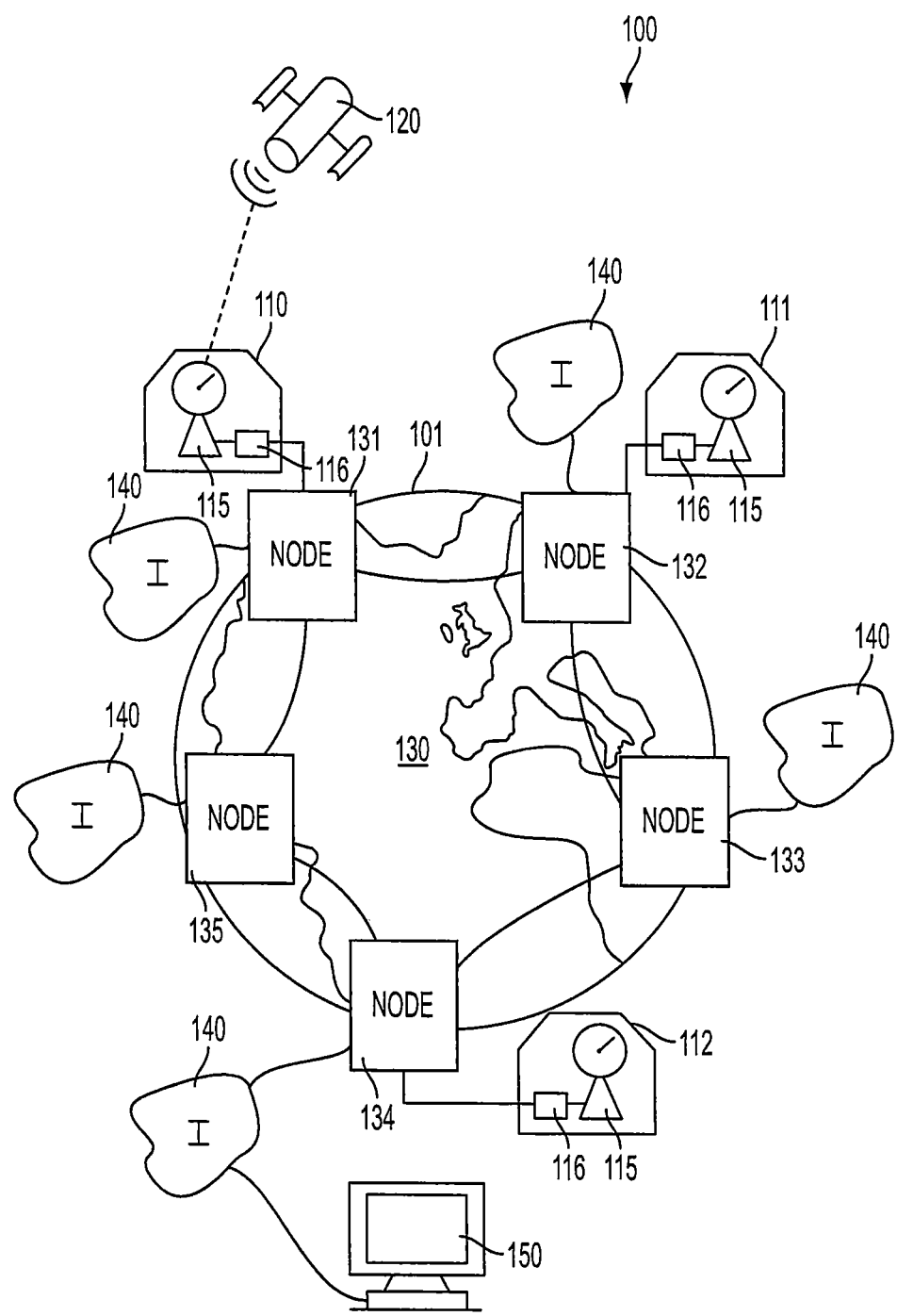
FIG. 1 is a schematic representation of the overall system for the delivery of data according to an embodiment of the invention.

FIG. 1 is a schematic representation of the data delivery system 100 according the invention to collect data and to forward this to an end user.

In FIG. 1, with the reference number 101, a schematic representation of the globe is shown. On the globe 101 a first 110, a second 111 and a third 112 datacenter are installed at a first, a second and a third location. In FIG. 1, as an example, three datacenters are shown. It should be understood that the system 100 could comprise any suitable number of datacenters.

The datacenters 110, 111 and 112 are each provided with a source of data, for example a satellite receiver 115, such as a satellite dish, for receiving data transmitted by a satellite 110. Other examples of data sources include cable, terrestrial, IPTV and any other type of broadcast or transmission. The datacenter also comprises a processor 116 for processing the data received by the receivers 115.

The datacenters 110, 111 and 112 are each connected to a node 131, 132 and 134 of a Content Delivery Network (CDN) 130. A CDN is typically defined as a group of strategically located high capacity Internet connected network servers which work together to distribute content in a manner that is of higher speed and quality than were the data to be transported without the CDN. According to FIG. 1 the CDN comprises five nodes. It should be understood that the CDN 130 could comprise any suitable number of nodes.

As shown in FIG. 1, only some of the nodes 131, 132 and 134 are connected to a datacenter 110, 111 and 112. Some nodes 133 and 135 are not connected to a datacenter, but could be connected to a datacenter if preferred.

All the nodes 131-135 of the CDN 130 are connected to the Internet 140. This allows the system 100 to receive a request from an end user to have access to data which are available on the CDN 130. This request will be received by one of the nodes 131-135 of the CDN 130 and can be sent to the nodes 131-135 via the Internet 140. Once the identity of the requester has been verified the data can be forwarded to the requester via the Internet 140. The end user can then watch the data on a computer 150 connected to the Internet 140. The manner in which this occurs will be described in greater detail with reference to FIG. 2.

The use of the system 100 according to FIG. 1 is as follows:

The datacenters 110, 111 and 112 are strategically positioned around the globe, in order to capture satellite transmissions which have a specific geographic region. Each datacenter 110, 111 and 112 will be set up to ensure proper reception of audio and video signals on the receivers 115. The datacenter will typically include a bank of receivers 115, each of which are specific to a particular user and belong to that user although located in the datacenter. In this way, a satellite or cable television signal is received by a receiver in the appropriate territory and belonging to a particularly user who wishes to view the television signal and does not want to rely on connectivity from a receiver that is located in the user's home when the user is often travelling. The operator acts as a host for the receivers to ensure operation is maintained at all times, by means of backup power, cooling machines and backup connection facilities. In addition, the receiver is hosted in a datacenter which is maintained on a 24 hr basis in an optimal manner.

After the step of receiving the signals on the receivers 115, the signals will be processed, using the processors 116 in the datacenters 110, 111 and 112. The processors 116 are used to digitize and encode the received signals and to direct an output to the Content Delivery Network (CDN) 130.

Figure 2:
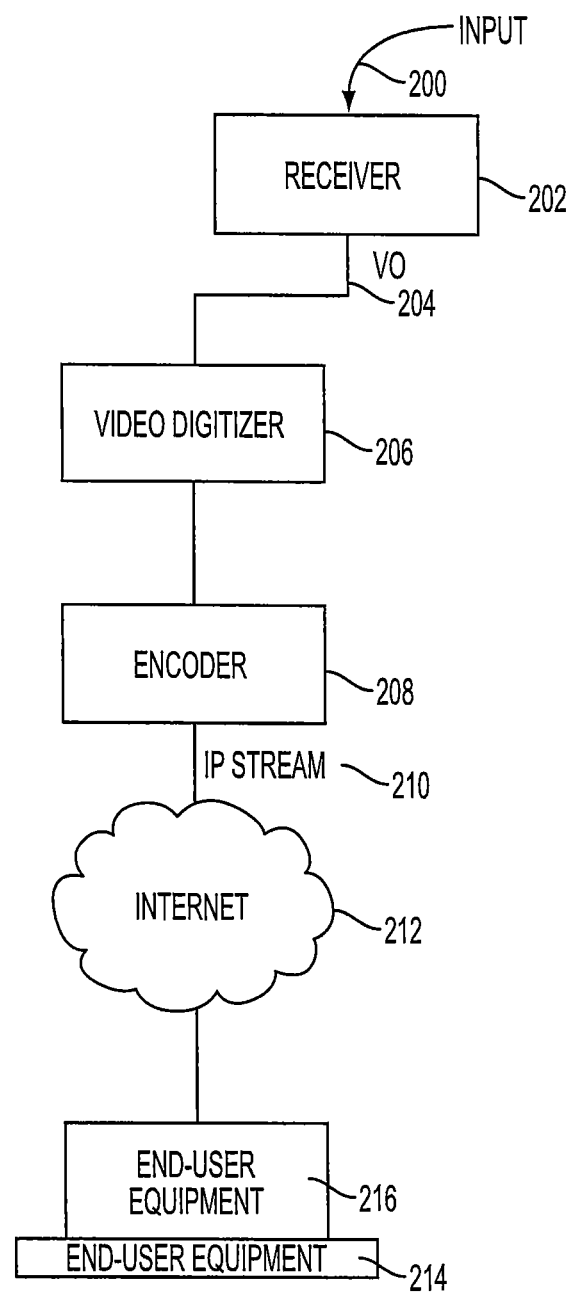
FIG. 2 is a block diagram of part of the data delivery apparatus, in accordance with an embodiment of the invention.

Referring to FIG. 2, in the processing step an input signal 200 received by the receiver 202 is converted into a video and audio out signal 204 which is fed into a video digitizer 206 where it is converted into a full bandwidth digital transport stream. The digitized transport video stream is fed via a high bandwidth data bus (not shown) into an encoder 208. The data bus used will be, for example, an IEEE 1394 Fire-wire 400 or 800. The encoder 208 includes a high quality compression engine and is used to encode and compress the digitized transport video stream into a high quality compressed IP (Internet Protocol) stream 210. After this step the IP stream 210 is suitable for transport across a packet network 212, such as the Internet and or a CDN. A CDN (not shown) is utilised within the network 212 to further increase quality and reliability. The end user equipment 214 and 216 is mobile and may be located in any location in the world. The end user equipment includes a computer 214 with an associated screen 216. The IP stream 210 is received by the computer 214 and displayed for view on the associated screen 216.

The several datacenters 110, 111 and 112 all feed the data they have received and processed into the CDN node which is, in an IP address sense, topographically the closest to each. The datacenter 110 will feed the data into the node 131, the datacenter 111 into the node 132 and the datacenter 112 into the node 134.

In the present description reference is made to the fact that the datacenters 110, 111 and 112 feed data received by the receivers onto the nodes 131, 132 and 134 of the CDN 130. It should be understood that the datacenters 110, 111 and 112 could be provided with further means for receiving audio and video signals. The datacenters 110, 111 and 112 could for instance be provided with a variety of customer owner sources such as cable television sources, Digital terrestrial broadcast material, IPTV appliances and so forth. The data received from these additional data sources could all be equally fed into the CDN 130 once digitized and compressed as described above.

The fact that the data have been fed into the several nodes 131, 132 of the CDN 130 and 134 and the fact that the nodes 131-135 of the CDN 130 are connected to the Internet allows an end user to have access to the data from whichever CDN node is closest to the end user's location, wherever that may be.

The communication between the end user and the CDN 130 will be as follows: the end user will need to create an account with the operator of the system 100 and purchase a receiver that is appropriate to the location of the original data required by the user. The user may have an account which includes access to different sources in different locations. For example, a user may have a receiver adapted to receive UK television signals in a UK datacenter and a receiver adapted to receive US television signals in a US datacenter. The operator will allocate a user-name and a password to the account. The operator may allocate different usernames and passwords for different sources or may provide a single username and password for all sources. The operator will run an Internet based portal in order to communicate with the end user.

Figure 3:
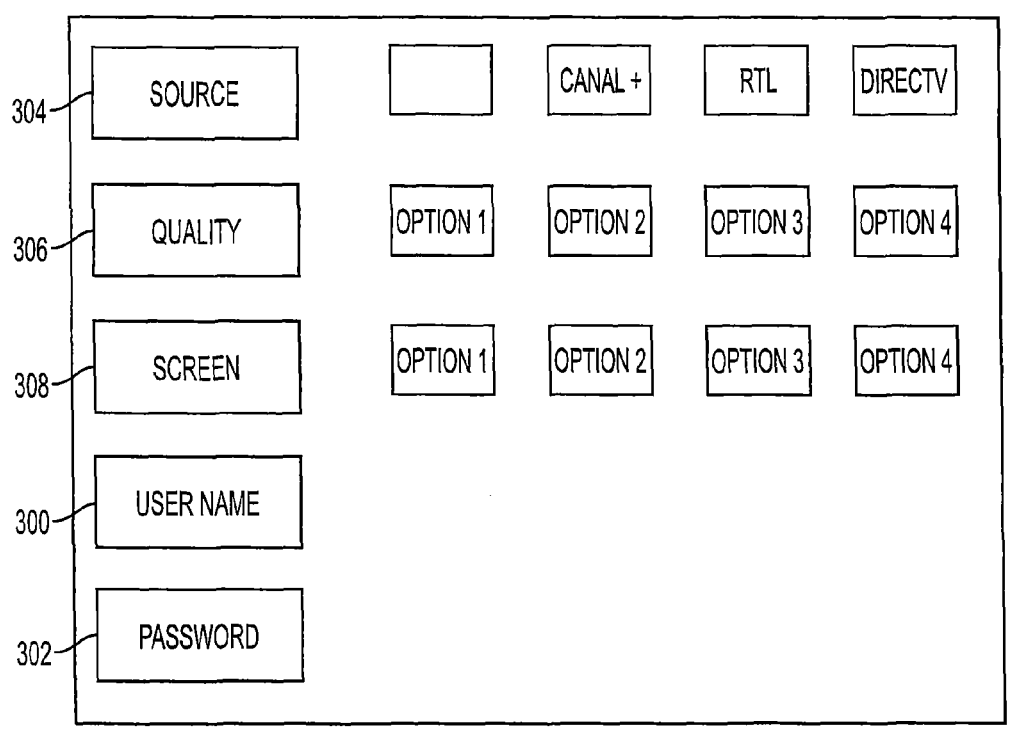
FIG. 3 is a block diagram of a schematic screen display for a user, in accordance with an embodiment of the invention.

The end user will connect to the portal in order to start a communication with the operator so as to access data. FIG. 3 shows a figurative screen presented to the user to enable selection and identification. The screen forms part of a GUI interface which converts user inputs into commands. On the Internet based portal the end user will, in a first step, identify himself using a username 300 and a password 302. The operator will verify the identification of the end user and if the verification is positive, allow the end user to use the services provided by the operator for that user account. The user may be able to select a source 304 of the video for which the user has a receiver in the appropriate location or datacenter. For example, Canal+ in France, RTL in Germany or DIRECTV in USA. In addition, the user may provide an indicator of the quality required or available 306 in terms of bandwidth and any other appropriate information that will enable the operator to deliver the highest quality signal to the user for the available bandwidth at the user location. A further indicator 308 may give an indication of screen size and definition. Clearly the portal may be configured in any appropriate way and include any information that will enable the user and operator to guarantee the highest quality video signal can be viewed by the user. Once the user has been positively verified and selected a source and quality indicator, the IP stream is delivered directly to the user in real-time such that the user can watch the television transmission from the country of origin in the user's present location. There may be a latency of several seconds between the real time of reception of the television signal at the datacenter and the delivery thereof at the end user equipment. It should be noted that the end user does not need to install any television receivers or any other hardware although, there will be a means of converting the IP stream back into video for viewing.

In order to receive the data from the CDN 130 the end user will connect to the Internet based portal, using an Internet connected computer 150. The connection between the end user and the Internet based portal could take place anywhere on the globe 101. The Internet based portal will identify the CDN node which is in an IP address sense topographically the closest to the end user. In the example of FIG. 1, the CDN node 134 is closest to the end user.

According to the example of FIG. 1, the request from the end user to have access to data will be received and processed on the node 134 of the CDN 130, closest to the end user. In the example of FIG. 1, the end user has requested to receive the data received by the satellite receiver 115 of the datacenter 110. This data will be forwarded from the node 131 to the node 134 using the CDN 130. Since the CDN 130 is used, negative technical factors due to the transport of the data that may detract from end user experience can be avoided. Thereafter the data is forwarded from the node 134 via the Internet towards the computer 150 of the end user. The computer 150 is used to decompress and visualize the images on the computer 150 of the end user.

It should be noted that the end user is able to receive and view the data on any computer connected to the Internet anywhere in the world. This means that the end users can use any device to receive and view the data, with only universally available Internet browsing software. The end user does not need any other hardware to be able to use the method and the system according to the invention.

In the system 100 according to FIG. 1, the encoding technique that is used could be the technique referred to as H.264/ MPEG4 AVC. This is a widely adopted video compression standard. As an example a binary executable program to be used for processing the video into an IP format could be the program developed and distributed by FFMPEG.ORG under GNU LPL Version 2.1. Clearly other compression standards or conversion programs could be used.

The method and system described with respect to the drawings is aimed at end users who want to be able to watch a television program of their choice wherever they are on the globe. Moreover, the method and the system are aimed at end users who want to be able to watch television without any compromise concerning the quality of the received signal. There is no compromise to the quality of video as the original source video is produced in an appropriate location and is then processed by digitising and high-quality encoding before being converted into an IP stream. The IP stream in then transmitted over the Internet at a quality level that is dictated by the Internet and the user connection to the Internet. The IP stream is then decoded at the user equipment for viewing on any appropriate screen. Accordingly there is no degradation in quality of the video viewed by the end user and the only limitation is the user connection bandwidth.

The method and the system 100 according to the present invention is specifically aimed at boat or yacht owners who want to be able to watch television wherever their yacht is located. With the method and the system 100 the location of the yacht does not influence the availability of television channels nor the quality of the television reception. The method according to the present invention is also ideally suited for any traveller in possession of a computer or with access to a computer.

In the prior art it is possible today for yacht-owners to watch satellite transmitted television programs. In order to allow this the yacht should be equipped with a satellite dish in order to receive the television signal. The television signal will only be available if and when the satellite dish on the yacht is in the "footprint" of the transmission. In order to be able to watch television from multiple TELEVISION satellites, multiple satellite receivers would need to be installed on board.

In the present invention, however, a yacht would only need a data connection in order to be able to receive any or all television signals from anywhere in the world.

Figure 4:
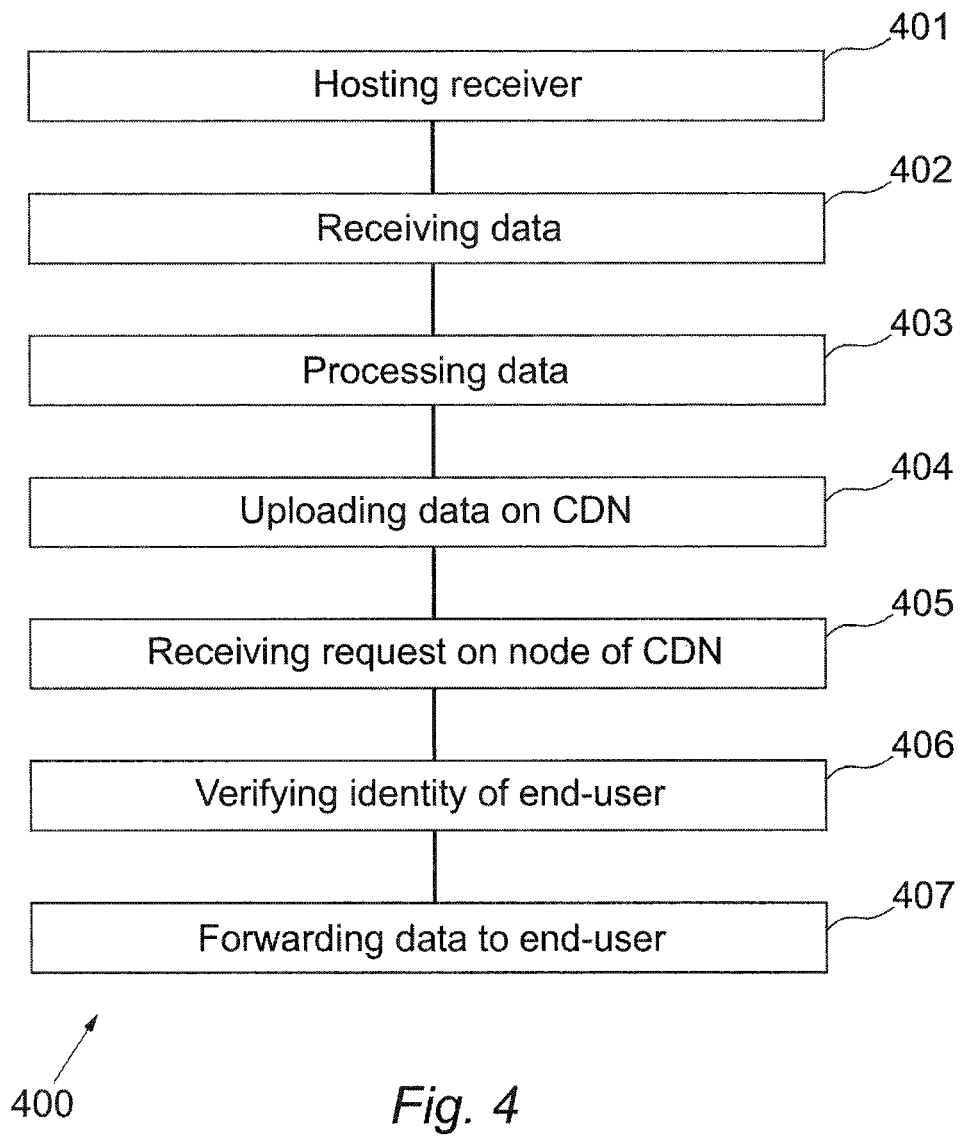
FIG. 4 is a schematic representation of a method, in accordance with an embodiment of the invention, given by way of example

FIG. 4 is a schematic representation of a method 400 in accordance with the invention in order to allow an end user to receive data.

In a first step 401 a receiver, belonging to a user, is installed in a first location of an operator. This receiver is adapted to receive data transmitted by any appropriate source, for example satellite or cable television transmission system.

In a second step 402 the data is received on the receiver and a video output is generated.

In a third step 403 the video output is digitized and encoded in order to prepare the data to be forwarded onto a network.

In a fourth step 404 the data is converted into an IP stream and is forwarded onto the network, such as a Content Delivery Network (CDN). The aim of this step is to be able to make the data available on the network and to be able to use the network to forward the data towards an end user.

In a fifth step 405 a node of the network receives a request to allow access to data on the network by a specific user from a specific datacenter.

Before allowing access to the data, in a sixth step 406, the identity of the requester is verified. If the verification is positive and the user is entitled to have access to the data, in a seventh step 407, the data is forwarded to the end user. According to the invention this last step is accomplished by using the Internet.

In a final step (not show), the IP streams are converted back to a video or other media signal for viewing by the user.

The present invention has been described with reference to both hardware and software elements. It will be appreciated that the system and the method could be implemented solely in hardware, solely in software or any combination thereof.

The invention claimed is:

1. A method for delivery of television data to an end user equipment, the method comprising:
    hosting, at a first stationary geographical location within a footprint of a first satellite transmission, a plurality of first satellite receivers, wherein each of the plurality of first satellite receivers is associated with a particular end user;
    wherein the footprint defines where the first satellite transmission is available;
    receiving television data on a first satellite receiver of the plurality of first satellite receivers;
    forwarding the received television data from the first satellite receiver to a first processor that processes the received television data into Internet packets;
    identifying a node of a plurality of nodes of a Content Delivery Network (CDN), wherein each node of the plurality of nodes is connected to the Internet and is at a different stationary geographical location;
    wherein the identified node is geographically closest to the first stationary geographical location relative to other nodes of the plurality of nodes;
    forwarding the processed television data from the first satellite receiver to the identified node;
    receiving, on a node of the plurality of nodes that is closest to the end user equipment relative to other nodes of the plurality of nodes, a request from the end user equipment to have access to the processed television data, wherein the end user equipment is at a geographical location outside the footprint and remote from the first geographical location;

verifying an identity of the end user;

responsive to a positive verification, forwarding, via the Internet, the processed received television data from the identified node to the node closest to the end user equipment; and forwarding the processed received television data from the node closest to the end user equipment to the end user equipment.

2. The method according to claim 1, wherein processing the received data comprises:

digitalizing the television data;

encoding the digitalized television data; and converting the encoded digitalized television data into an IP packet format.

3. A method according to claim 1, wherein the method further comprises the steps of:

hosting, at a second stationary geographical location within a footprint of a second satellite transmission, a plurality of second satellite receivers, wherein each of the plurality of second satellite receivers is associated with another end user;

receiving the television data on a second satellite receiver of the plurality of second satellite receivers;

forwarding the received television data from the second satellite receiver to a second processor that processes the received television data into Internet packets in order to allow the processed television data to be forwarded to the CDN;

identifying a node of the plurality of nodes that is geographically closest to the second stationary geographical location relative to other nodes of the plurality of nodes; and forwarding the processed television data from the second satellite receiver to the identified node.

4. The method according to claim 1, further comprising receiving the processed television data at the end user equipment.

5. The method of claim 4, further comprising, decoding the processed television data at the end user equipment.

6. A system for delivery of television data to an end user equipment, the system comprising:

a plurality of first satellite receivers hosted at a first stationary geographical location within a footprint of a first satellite transmission, wherein each of the plurality of first satellite receivers is associated with a particular end user;

wherein the footprint defines where the first satellite transmission is available;

a processor connected to the plurality of first satellite receivers, wherein the processor is configured to process television data received by a first satellite receiver of the plurality of first satellite receivers into Internet packets;

a Content Delivery Network (CDN) connected to the processor for receiving the processed television data on the CDN and for forwarding the processed television data to the end user equipment;

wherein the CDN comprises a plurality of nodes, each node of the plurality of nodes is at a different stationary geographical location and is connected to the Internet;

wherein the processed television data is received at a node of the plurality of nodes that is geographically closest to the first stationary geographical location relative to other nodes of the plurality of nodes;

wherein a node of the plurality of nodes that is closest to the end user equipment relative to other nodes of the plurality of nodes is configured to receive a request from the end user equipment to have access to the processed television data, wherein the end user equipment is at a geographical location outside the footprint and remote from the first stationary geographical location;

an identity verification tool for verifying an identity of the end user and for allowing or refusing the end user to access the processed received television data; and responsive to a positive verification, the processed received television data is forwarded, via the Internet, from the node that is closest to the first stationary geographical location to the node that is closest to the end user equipment and from the node that is closest to the end user equipment to the end user equipment.

7. The system according to claim 6, wherein the plurality of first satellite receivers are associated uniquely with end users.

8. The system according to claim 6, wherein a plurality of second satellite receivers are hosted at a second stationary geographical location within a footprint of a second satellite transmission.

9. The system according to claim 6, wherein the end user is located remote from the first stationary geographical location when accessing the television data transmitted in the first stationary geographical location.

10. The system according to claim 6, wherein the processor comprises an encoder.

11. The system according to claim 6, wherein the processor comprises a converter.

12. A node for use in a system, the system comprising:

a plurality of first satellite receivers hosted at a first stationary geographical location within a footprint of a first satellite transmission, wherein each of the plurality of first satellite receivers is associated with a particular end user;

wherein the footprint defines where the first satellite transmission is available;

a processor connected to the plurality of first satellite receivers, wherein the processor is configured to process television data received by a first satellite receiver of the plurality of first satellite receivers into Internet packets;

a Content Delivery Network (CDN) connected to the processor for receiving the processed television data on the CDN and for forwarding the processed data to an end user equipment;

wherein the CDN comprises a plurality of nodes, each node of the plurality of nodes is at a different stationary geographical location and is connected to the Internet;

wherein the processed television data is received at a node of the plurality of nodes that is geographically closest to the first stationary geographical location relative to other nodes of the plurality of nodes;

wherein a node of the plurality of nodes that is closest to the end user equipment relative to other nodes of the plurality of nodes is configured to receive a request from the end user equipment to have access to the processed television data, wherein the end user is at a geographical location outside the footprint and remote from the first stationary geographical location;

an identity verification tool for verifying an identity of the end user and for allowing or refusing the end user to access the processed received television data; and responsive to a positive verification, the processed received television data is forwarded, via the Internet, from the node that is closest to the first stationary geographical location to the node that is closest to the end user equipment and from the node that is closest to the end user equipment to the end user equipment.

13. An encoder for use in a system, the system comprising:
a plurality of first satellite receivers hosted at a first stationary geographical location within a footprint of a first satellite transmission, wherein each of the plurality of first satellite receivers is associated with a particular end user;
wherein the footprint defines where the first satellite transmission is available;
a processor connected to the plurality of first satellite receivers, wherein the processor is configured to process television data received by a first satellite receiver of the plurality of first satellite receivers into Internet packets;
a Content Delivery Network (CDN) connected to the processor for receiving the processed television data on the CDN and for forwarding the processed television data to an end user equipment;
wherein the CDN comprises a plurality of nodes, each node of the plurality of nodes is at a different stationary geographical location and is connected to the Internet;
wherein the processed television data is received at a node of the plurality of nodes that is geographically closest to the first stationary geographical location relative to other nodes of the plurality of nodes;
wherein a node of the plurality of nodes that is closest to the end user equipment relative to other nodes of the plurality of nodes is configured to receive a request from the end user equipment to have access to the processed television data, wherein the end user equipment is at a geographical location outside the footprint and remote from the first stationary geographical location;
an identity verification tool for verifying an identity of the end user and for allowing or refusing the end user to access the processed received television data; and
responsive to a positive verification, the processed received television data is forwarded, via the Internet, from the node that is closest to the first stationary geographical location to the node that is closest to the end user equipment and from the node that is closest to the end user equipment to the end user equipment.

14. A converter for converting television data to or from IP packets for using in a system, the system comprising:
a plurality of first satellite receivers hosted at a first stationary geographical location within a footprint of a first satellite transmission, wherein each of the plurality of first satellite receivers is associated with a particular end user;
wherein the footprint defines where the first satellite transmission is available;
a processor connected to the plurality of first satellite receivers, wherein the processor is configured to process television data received a first satellite receiver of the plurality of first satellite receivers into Internet packets;
a Content Delivery Network (CDN) connected to the processor for receiving the processed television data on the CDN and for forwarding the processed television data to an end user equipment;
wherein the CDN comprises a plurality of nodes, each node of the plurality of nodes is at a different stationary geographical location and is connected to the Internet;
wherein the processed television data is received at a node of the plurality of nodes that is geographically closest to the first stationary geographical location relative to other nodes of the plurality of nodes;
wherein a node of the plurality of nodes that is closest to the end user equipment relative to other nodes of the plurality of nodes is configured to receive a request from the end user equipment to have access to the processed television data, wherein the end user equipment is at a geographical location outside the footprint and remote from the first stationary geographical location;
an identity verification tool for verifying an identity of the end user and for allowing or refusing the end user to access the processed received television data; and
responsive to a positive verification, the processed received television data is forwarded, via the Internet, from the node that is closest to the first stationary geographical location to the node that is closest to the end user equipment and from the node that is closest to the end user equipment to the end user equipment.

15. A computer-program product comprising a non-transitory computer-usable medium having computer-readable program code embodied therein, the computer-readable program code adapted to be executed to implement a method comprising:
hosting, at a first stationary geographical location within a footprint of a first satellite transmission, a plurality of first satellite receivers, wherein each of the plurality of first satellite receivers is associated with a particular end user;
wherein the footprint defines where the first satellite transmission is available;
receiving television data on a first satellite receiver of the plurality of first satellite receivers;
forwarding the received television data from the first satellite receiver to a processor that processes the received television data into Internet packets;
identifying a node of a plurality of nodes of a Content Delivery Network (CDN), wherein each node of the plurality of nodes is connected to the Internet and is at different stationary geographical location;
wherein the identified node is geographically closest to the first stationary geographical location relative to other nodes of the plurality of nodes;
forwarding the processed television data from the first satellite receiver to the identified node;
receiving, on a node of the plurality of nodes that is closest to an end user equipment relative to other nodes of the plurality of nodes, a request from the end user equipment to have access to the processed television data, wherein the end user equipment is at a geographical location outside the footprint and remote from the stationary first geographical location;
verifying an identity of the end user;
responsive to a positive verification, forwarding, via the Internet, the processed received television data from the identified node to the node closest to the end user equipment; and
forwarding the processed received television data from the node closest to the end user equipment to the end user equipment.

* * * * *